Dec. 22, 1931.  C. BARBIERI  1,837,396
FILLING AND CAPPING MACHINE FOR CONTAINERS
Filed Nov.2, 1928    12 Sheets-Sheet 3
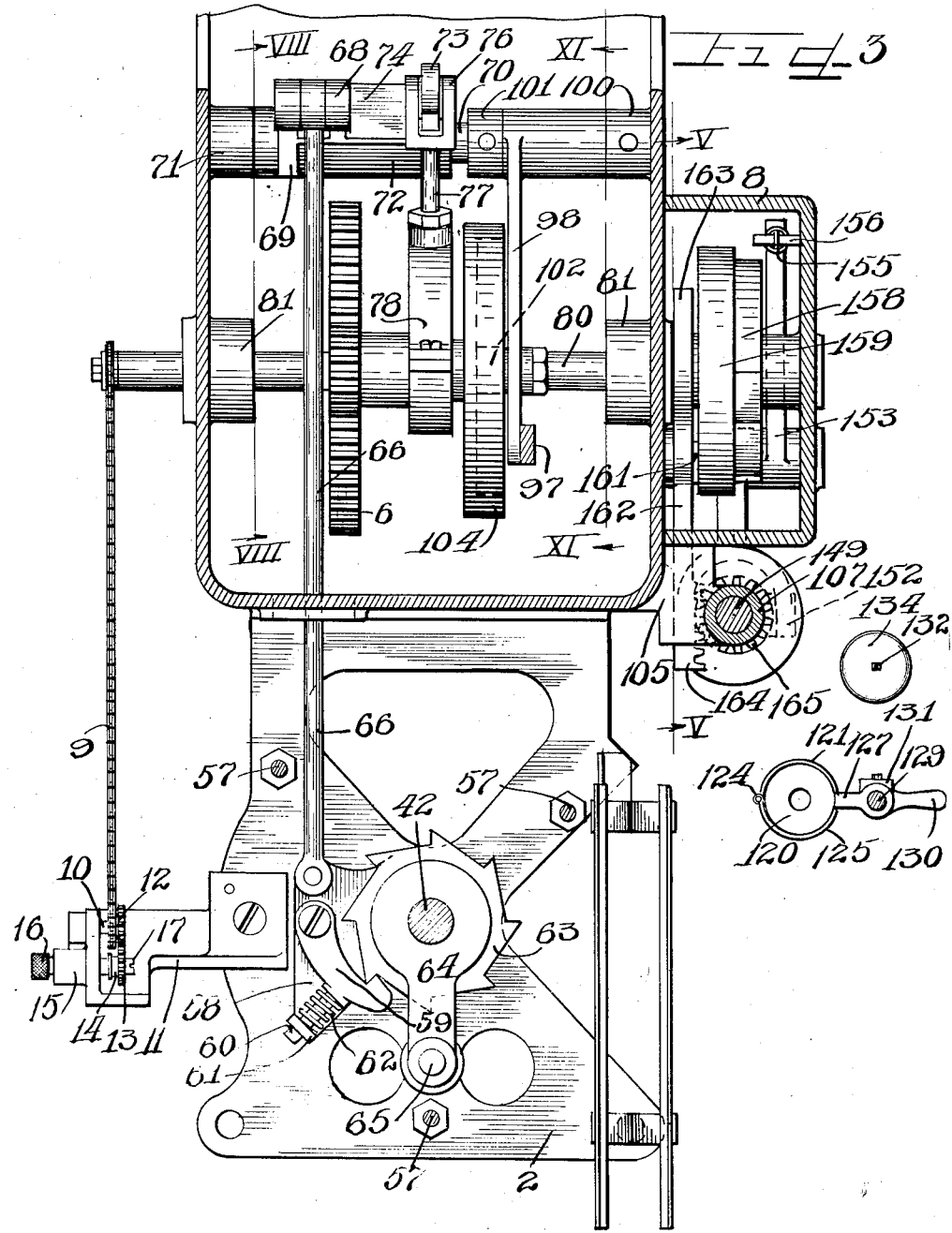
Inventor
Cesare Barbieri
by Charles ??? Attys Dec. 22, 1931. C. BARBIERI 1,837,396
FILLING AND CAPPING MACHINE FOR CONTAINERS
Filed Nov.2, 1928 12 Sheets-Sheet 4
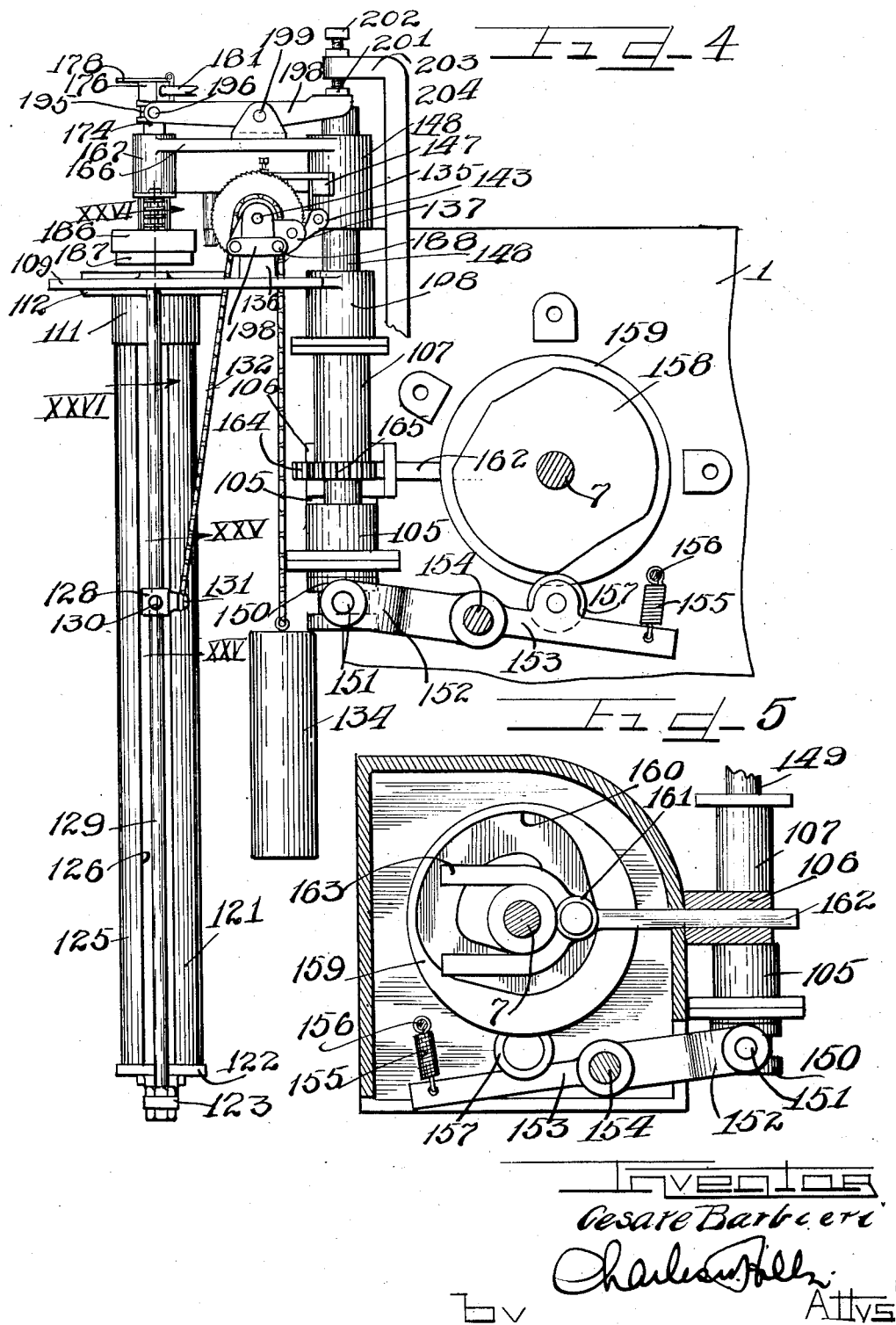

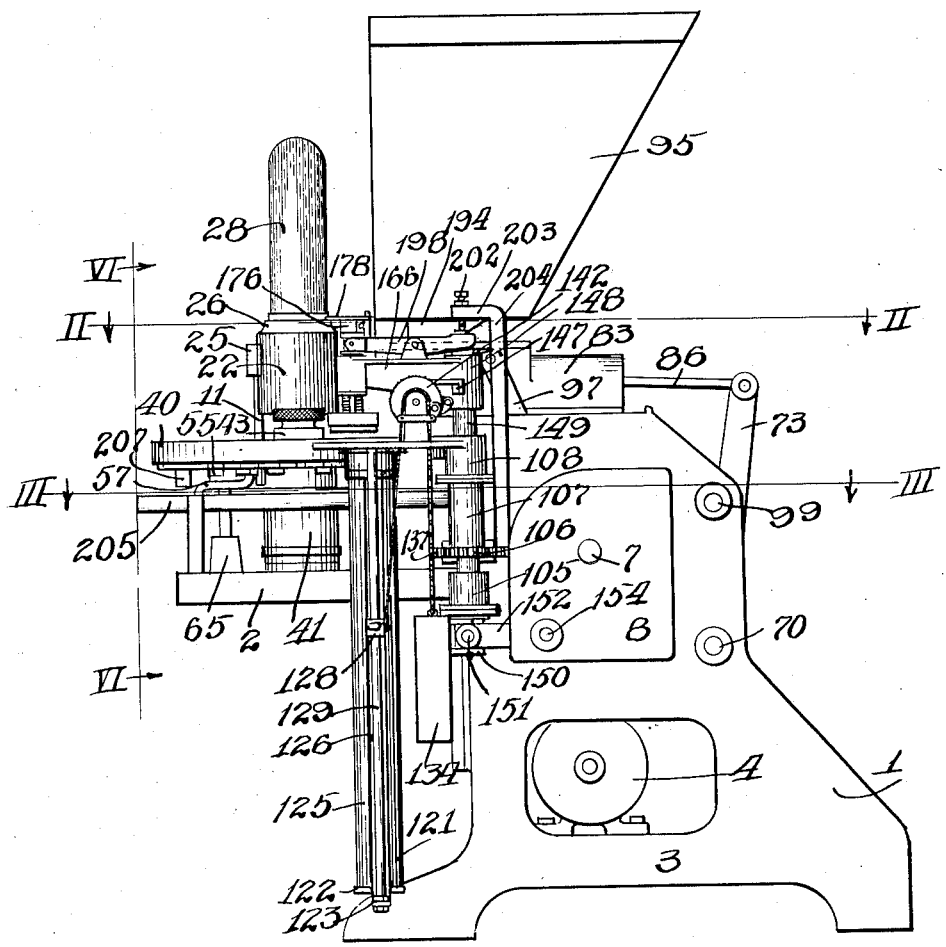

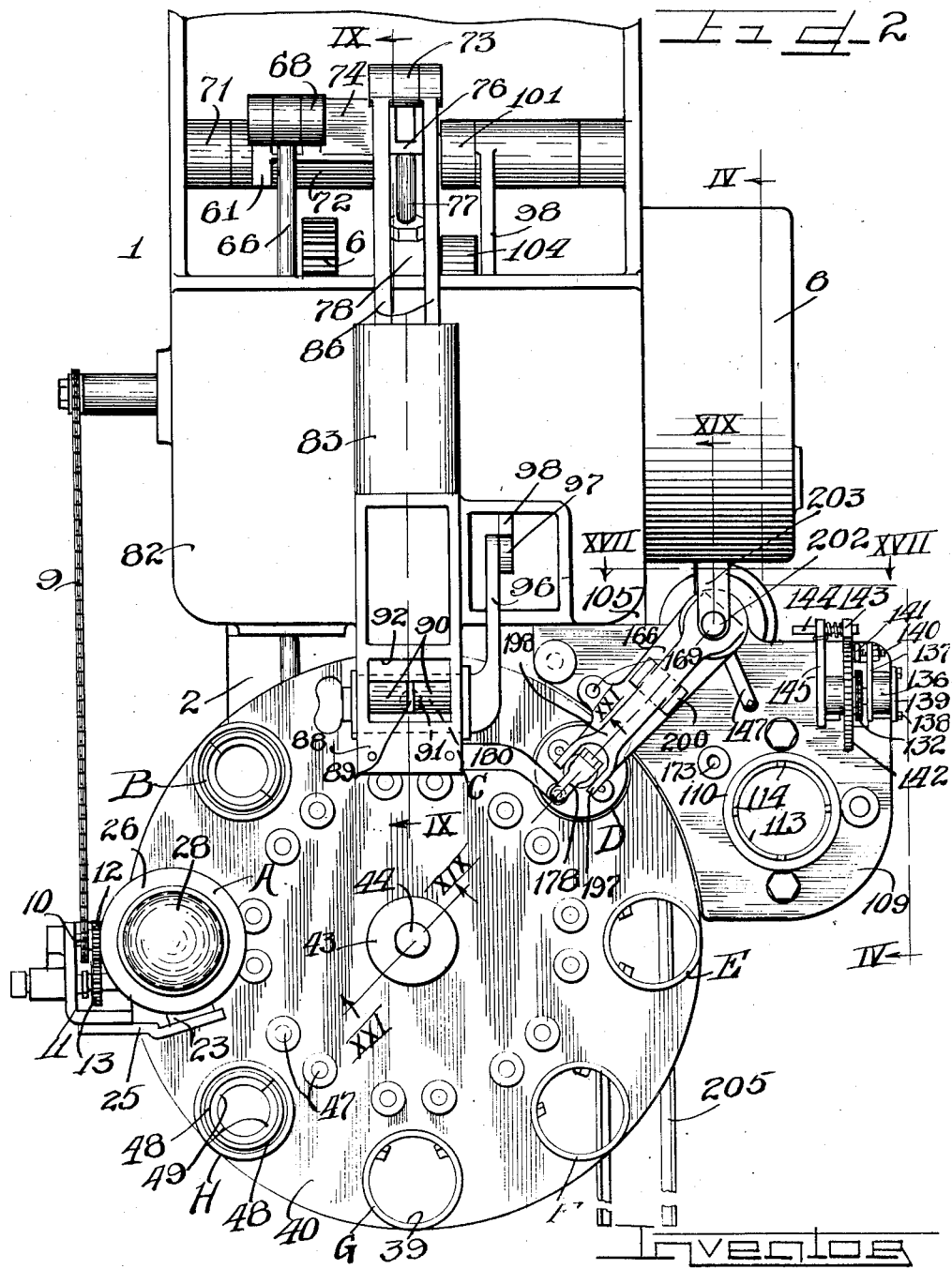

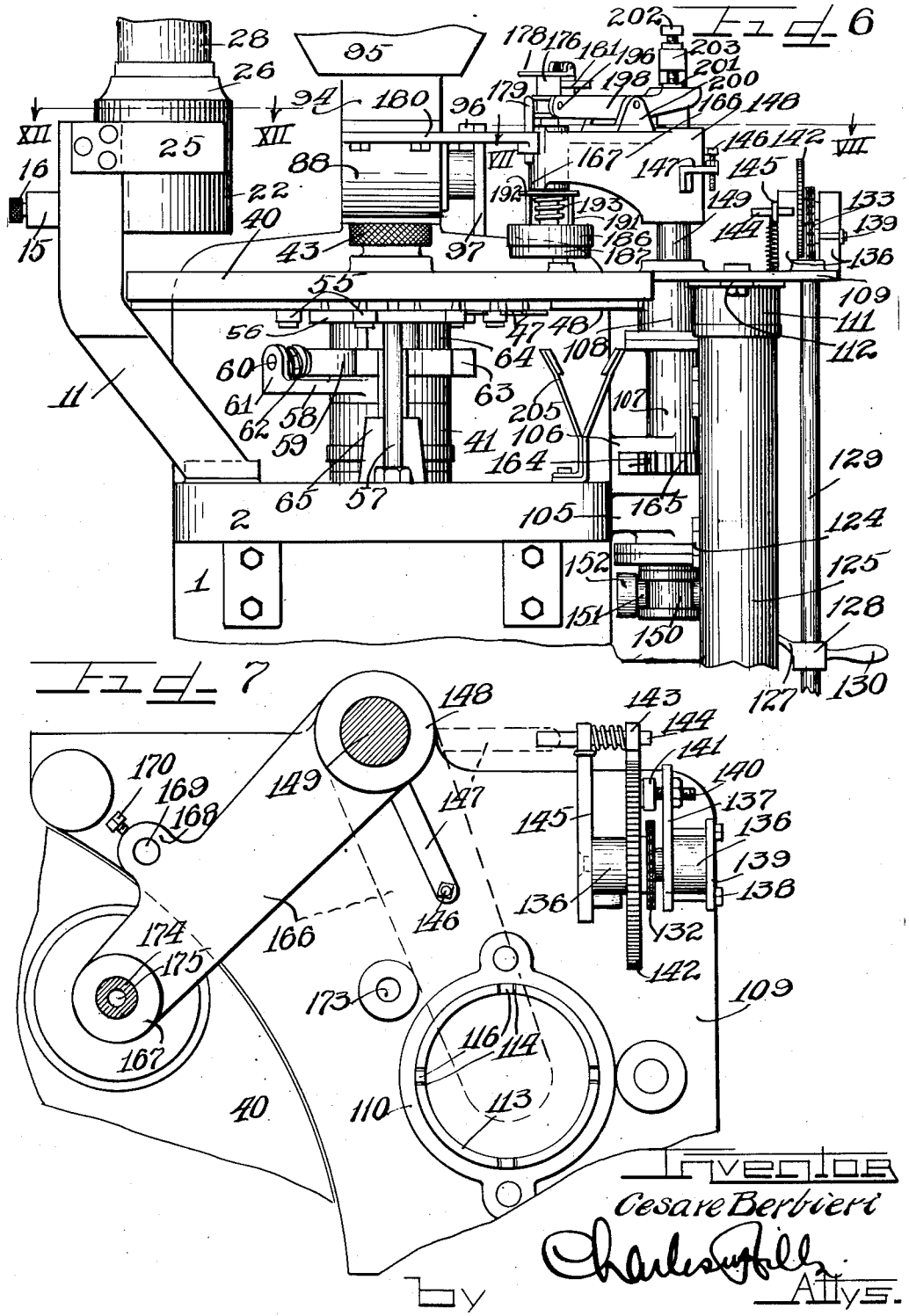

Dec. 22, 1931.  C. BARBIERI  1,837,396
FILLING AND CAPPING MACHINE FOR CONTAINERS
Filed Nov.2, 1928   12 Sheets-Sheet 6

Inventor
Cesare Barbieri
by Charles... 
Attys

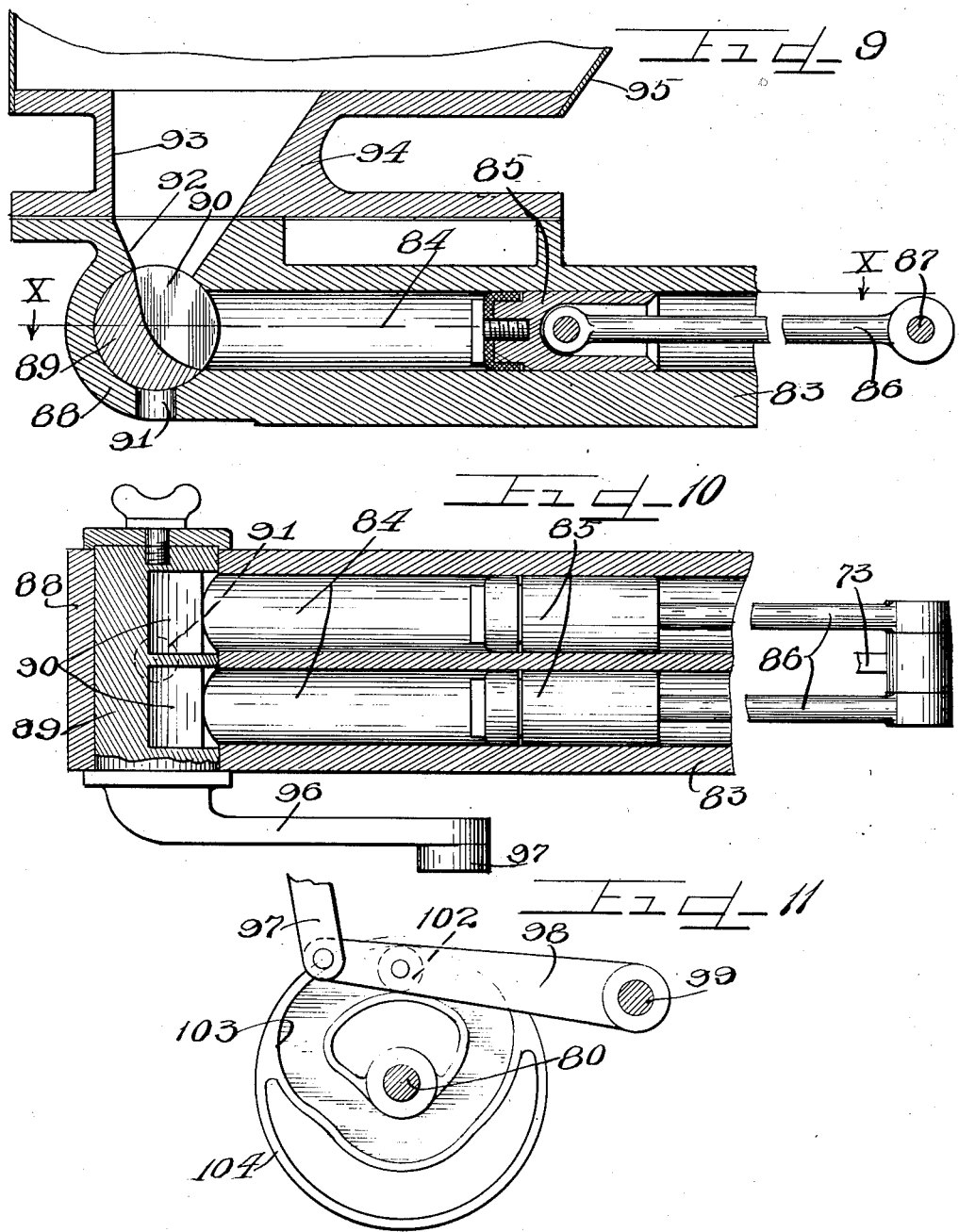

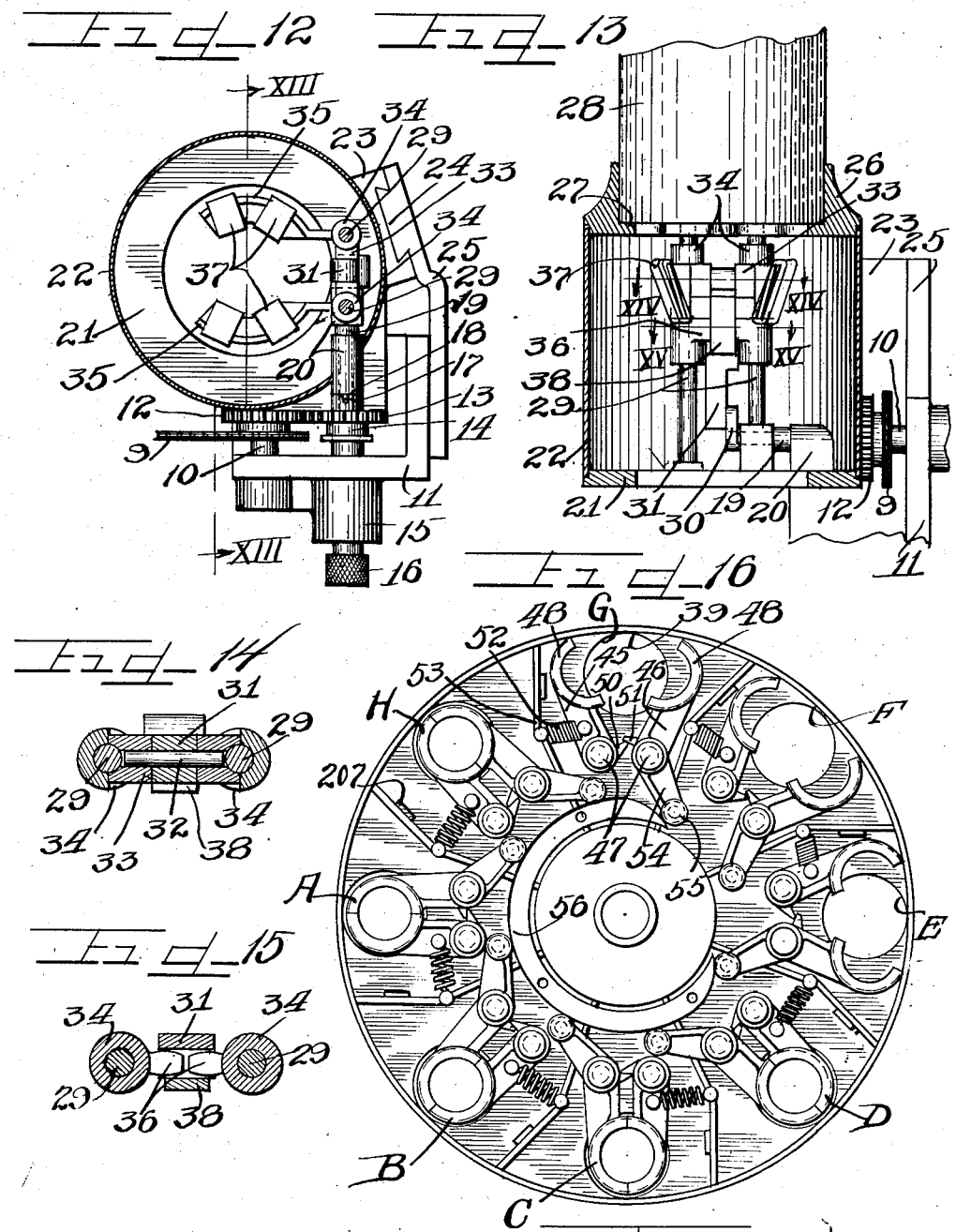

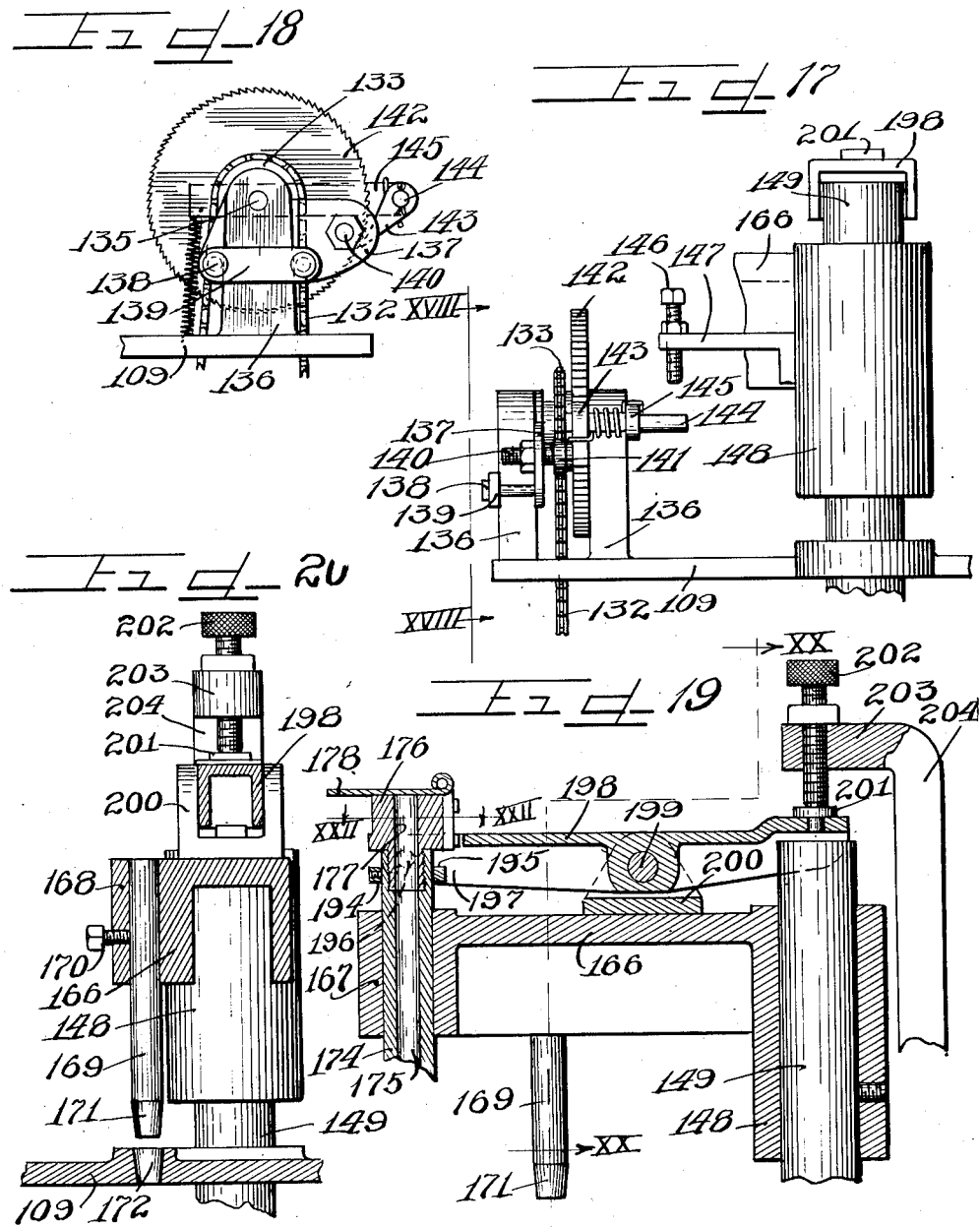

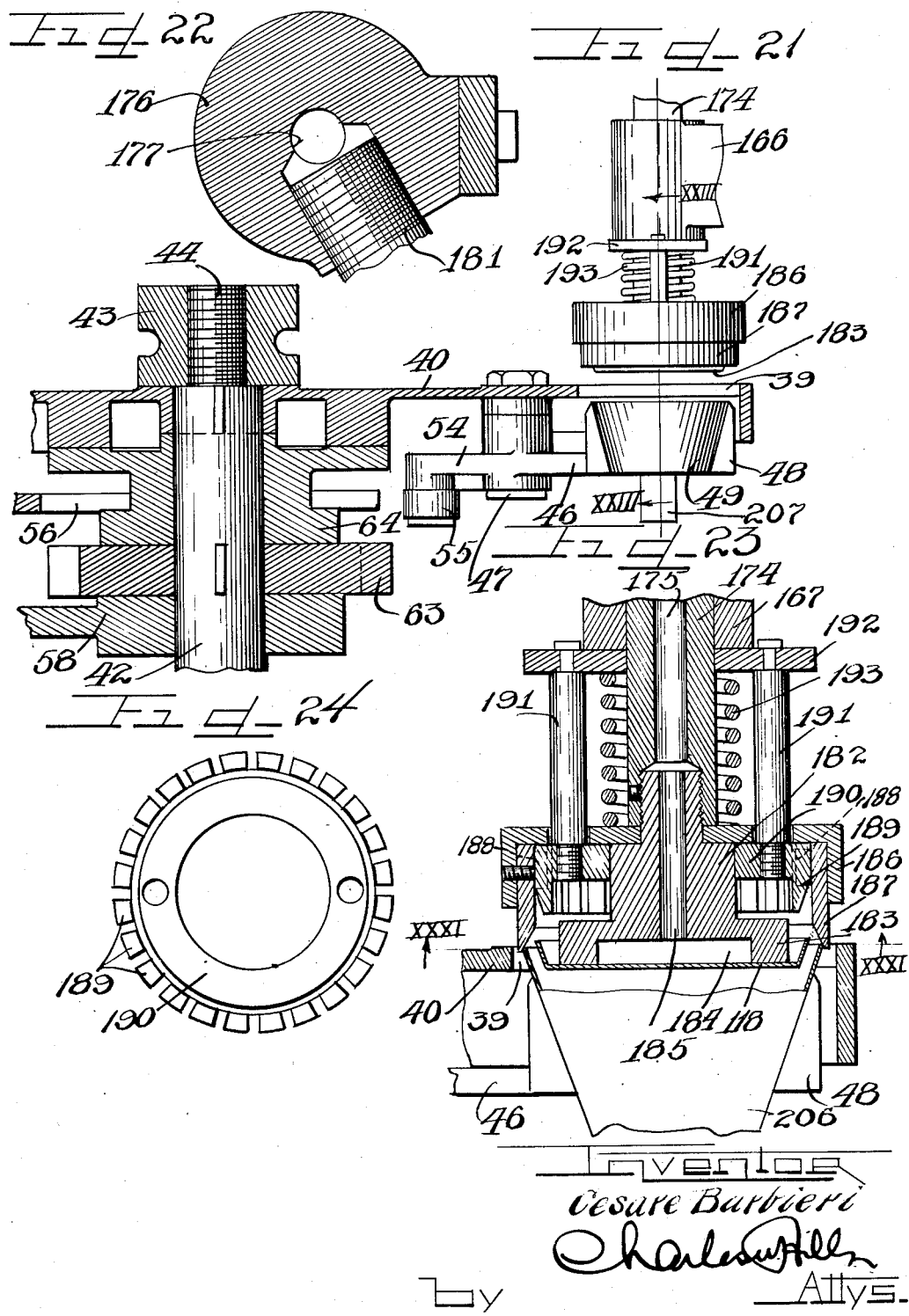

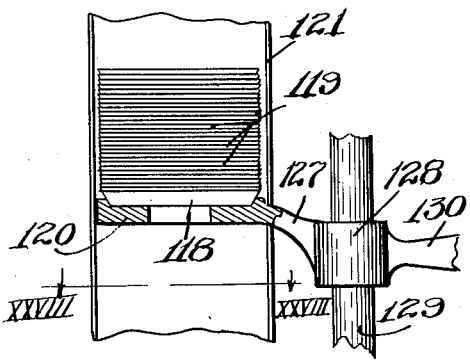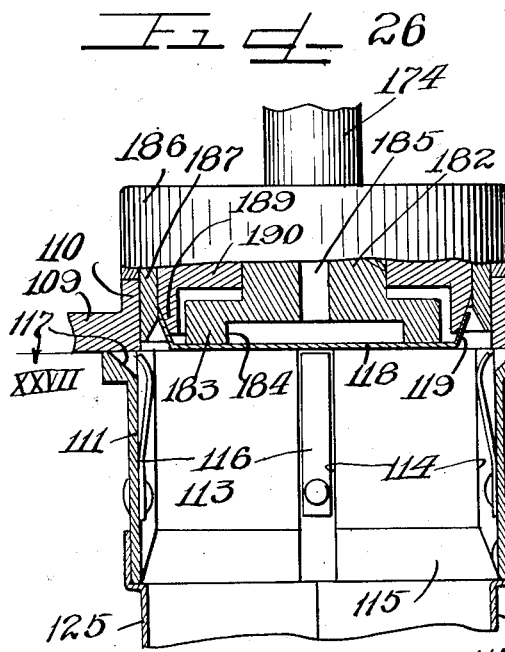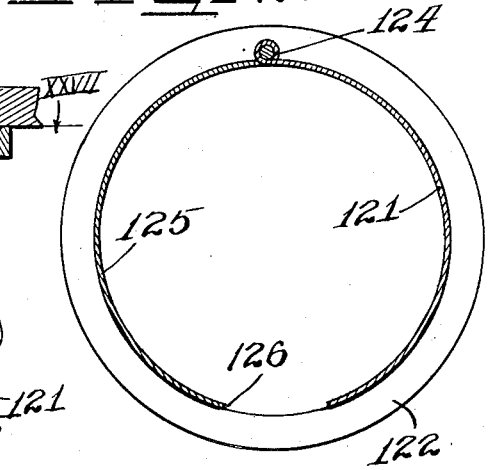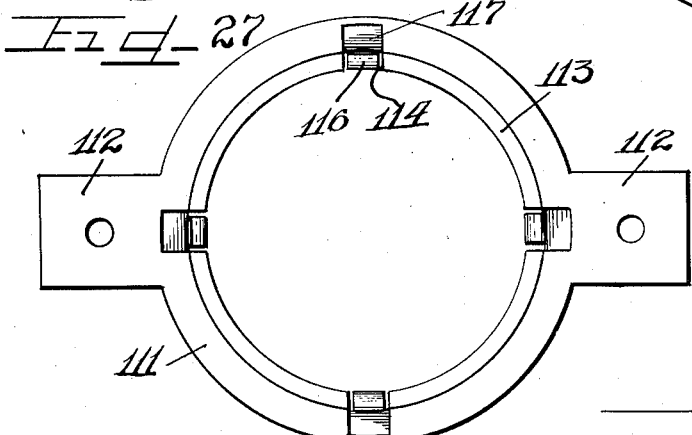

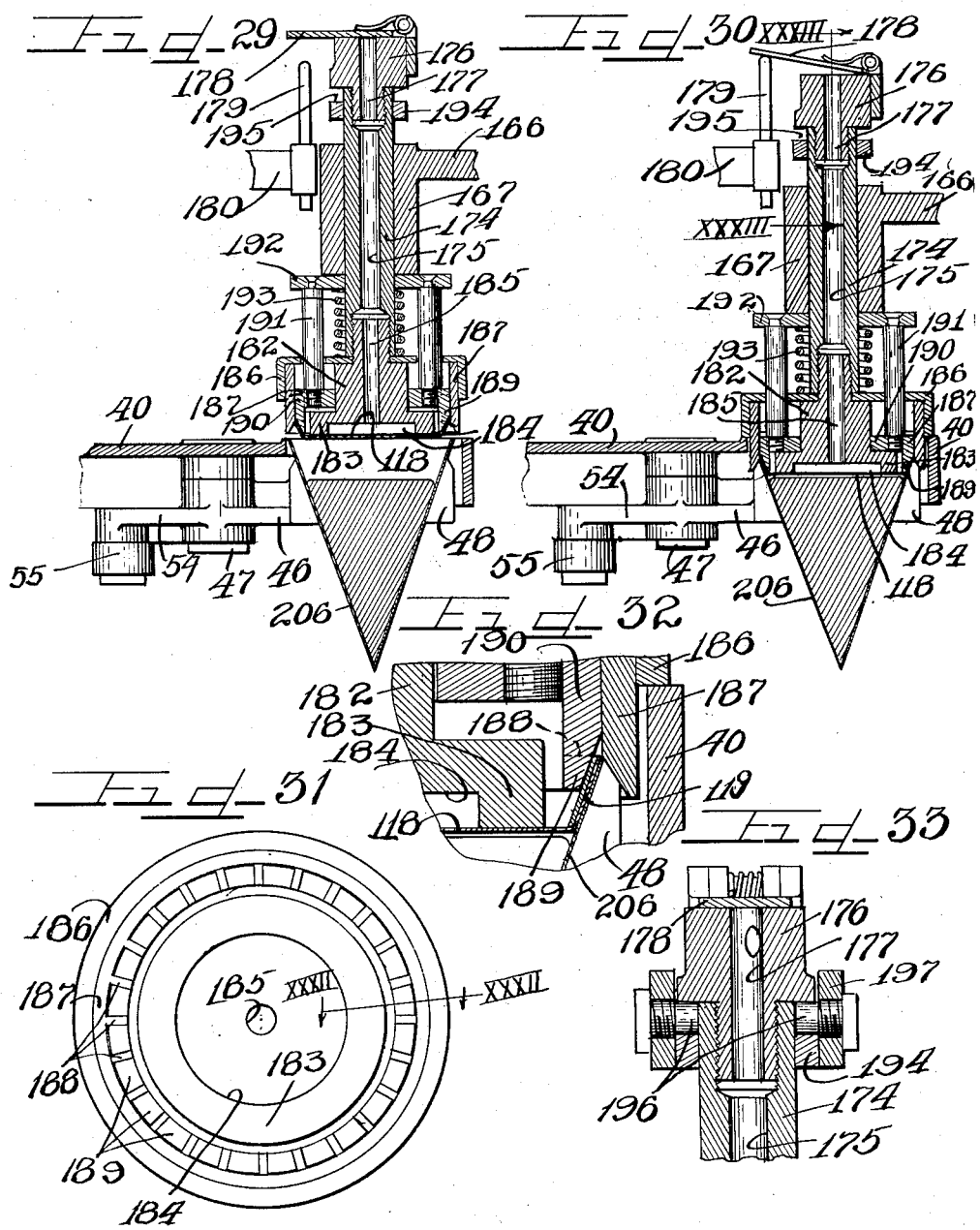

Patented Dec. 22, 1931

1,837,396

UNITED STATES PATENT OFFICE

CESARE BARBIERI, OF NEW YORK, N. Y., ASSIGNOR, BY MESNE ASSIGNMENTS, TO VORTEX CUP COMPANY, OF CHICAGO, ILLINOIS, A CORPORATION OF DELAWARE

FILLING AND CAPPING MACHINE FOR CONTAINERS

Application filed November 2, 1928. Serial No. 316,671.

This invention relates to an improved filling and capping machine for paper containers and the like and embraces a machine having a paper cup dispenser which is adapted to be operated automatically to dispense paper cups one at a time, depositing the cups in recesses or pockets formed in a rotatable turntable which is operated intermittently to advance the cups into a position beneath a hopper containing ice-cream, a drink or any other substance which is to be dispensed in the container. Disposed beneath the hopper is a valve control mechanism which governs the outlet of the material from the hopper and is arranged to permit a predetermined quantity of the material to be deposited at a predetermined time in a container which is positioned in a receiving position. After a container has been filled the turntable is automatically advanced a predetermined distance to carry the filled container into a position directly beneath a cap delivering and crimping mechanism which normally is positioned in an outer position above a cap supply mechanism connected for operation by the machine to automatically feed caps upwardly into a position wherein the uppermost cap in the stack is adapted to be pneumatically gripped by the cap delivering and crimping mechanism which is then swung inwardly toward the hopper into a position above the filled cup to permit the delivered cap to be lowered into the open end of the container above the contents thereof after which the crimping mechanism is automatically operated to cause the upper margin of the container to be deflected inwardly and then bent downwardly and crimped over the flange of the delivered cap to hold said cap in a locked position. The filled and capped container is then advanced by the rotatable turntable into a position wherein the filled and capped container is removed from the turntable and delivered into a suitable receiving rack positioned thereunderneath from which the filled and capped containers may be readily removed and properly stored or dispensed as the case may be.

It is an object of this invention to provide a filling and capping machine wherein containers are delivered to a rotatable turntable which in turn acts to carry the containers through the fields of operation of a material dispensing attachment and then to a cap delivering mechanism which also acts to crimp a margin of the container over the cap to properly enclose and protect the contents of the container.

It is also an object of this invention to provide an automatic machine adapted to feed, fill and then cap containers prior to discharge from the machine.

It is a further object of this invention to provide a machine wherein a cup dispensing magazine is arranged to automatically deposit cups in pockets formed in a rotatable turntable which is controlled by a pawl and ratchet mechanism to cause the turntable to rotate intermittently to advance the cups one at a time into position to be automatically filled and then capped, before being permitted to drop through the pocket of the turntable into a receiving chute.

It is furthermore an object of this invention to provide a machine wherein an intermittently rotatable turntable is adjusted to carry cups in successive order below an automatically operating filling mechanism adapted to deposit a predetermined quantity of a material into a cup after which the filled cup is again advanced into the field of operation of a pivotal pneumatically controlled cap gripping mechanism which is adapted to withdraw a cap from a cap magazine and transfer the same into a position over the filled cup to permit the delivered cap to be dropped into position within the filled cup prior to the operation of a crimping mechanism which acts to crimp the upper margin of the cup over the cap to hold the cap in position.

Still another object of the invention is to provide a machine wherein a rotatable turntable is adapted to carry cups through the field of operation of an automatic filler which is adapted to deposit predetermined quantities of a material in the cups after which the turntable advances a filled cup beneath a capping and crimping device arranged to operate automatically to first deliver a cap into the filled cup and then crimp the margin of the cup over the cap, after which the turntable is again advanced into a position wherein cam controlled fingers which hold the filled cup in position in the turntable are adapted to be automatically opened to permit the filled cup to drop into a receiving chute.

Another object of the invention is to provide a filling and capping machine wherein a rotatable turntable is adapted to carry cups into a position beneath a hopper having a cam controlled valve positioned therebeneath and connected with a measuring cylinder adapted to receive a predetermined quantity of material from the hopper after which the valve is automatically closed prior to the operation of a plunger mechanism which acts automatically to force the contents of the cylinder into the cup which is then advanced by the turntable into the fields of operation of a cap supply device which also serves to crimp the margin of the filled cup over the cap to protect the contents of the cup.

It is still another object of this invention to provide a filling and capping machine wherein a turntable is adapted to carry filled cups one at a time into the field of operation of a cap feeding device which is pivotally mounted to first swing into position above a stack of caps and remove the caps one at a time by pneumatic means, after which a removed cap is carried back into a position above a filled cup into which the cap is deposited before a crimping mechanism forming a part of the cap delivering device is brought into operation to crimp the margin of a filled cup over the flange of a deposited cap to protect the contents of the cup which is then advanced by the turntable above a receiving chute into which the filled and capped cup is adapted to be deposited when cam controlled holders on the bottom of the turntable are automatically released.

It is an important object of this invention to provide a filling and capping machine of the rotary type in which empty cups are adapted to be delivered one at a time to a rotatable turntable which operates intermittently to deliver the empty cups beneath an automatic filling mechanism which deposits a predetermined quantity of a material into a cup after which the filled cup is advanced by the turntable into a position beneath an automatic cap feed device which pneumatically grips a cap and releases the cap to permit the same to drop into a filled cup, to permit the margin of the cup to be automatically crimped around the flange of the deposited cap to completely enclose the contents of the cup prior to the automatic release of a cup holder carried by the turntable thereby permitting the filled and capped cup to drop through the turntable into a suitable receiving chute from which the filled cap may be taken and properly stored or dispensed as the case may be.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of an improved filling and capping machine for containers embodying the principles of this invention.

Figure 2 is an enlarged fragmentary horizontal view of the machine taken on line II—II of Figure 1.

Figure 3 is an enlarged fragmentary horizontal section taken on line III—III of Figure 1 with parts shown in elevation.

Figure 4 is an enlarged vertical detail section of the cap feed mechanism taken on line IV—IV of Figure 2.

Figure 5 is a fragmentary vertical section of the top piece control mechanism taken on line V—V of Figure 3.

Figure 6 is a fragmentary front elevation of the machine taken on line VI—VI of Figure 1.

Figure 7 is an enlarged fragmentary horizontal view of the cap feed mechanism taken on line VII—VII of Figure 6, and illustrating the operation of said cap feed mechanism in dotted lines.

Figure 9 is an enlarged fragmentary vertical section taken on line IX—IX of Figure 2 and illustrating the valve control and plunger mechanisms governing the feeding of material into cups carried on the turntable.

Figure 10 is a fragmentary horizontal section of the material feed mechanism taken on line X—X of Figure 9.

Figure 11 is a vertical detail view of the control cam and associated mechanism which governs the operation of the material feed valve, with said view taken on line XI—XI of Figure 3.

Figure 12 is an enlarged horizontal sectional view taken on line XII—XII of Figure 6 and illustrating the interior operating mechanisms of the cup feed magazine.

Figure 13 is a vertical sectional view of the cup feed magazine taken on line XIII—XIII of Figure 12 illustrating parts in elevation.

Figure 14 is a horizontal detail section taken on line XIV—XIV of Figure 13 with the cup feed arms omitted.

Figure 15 is a fragmentary detail section taken on line XV—XV of Figure 13.

Figure 16 is a bottom plan view of the cup turntable illustrating the cam control governing the cup supporting arms associated with the openings in the turntable.

Figure 17 is a fragmentary vertical view taken on line XVII—XVII of Figure 2 illustrating the support for the cup transfer arm and the feed control mechanism governing the upward feeding movement of the caps in the cap feed magazine.

Figure 18 is a side view taken on line XVIII—XVIII of Figure 17 illustrating the feed control for the caps.

Figure 19 is an enlarged vertical detail section of part of the crimping mechanism taken on line XIX—XIX of Figure 2 with parts shown in elevation.

Figure 20 is a vertical sectional view taken on line XX—XX of Figure 19.

Figure 21 is an enlarged vertical detail section taken on line XXI—XXI of Figure 2 illustrating a portion of the turntable in section and showing the cap feed and crimping mechanisms in elevation.

Figure 22 is an enlarged fragmentary transverse section taken on line XXII—XXII of Figure 19.

Figure 23 is an enlarged vertical detail section of the cap feed and the cup crimping mechanism taken on line XXIII—XXIII of Figure 21 with parts shown in elevation.

Figure 24 is a bottom plan view of the crimping die removed from its holder.

Figure 25 is an enlarged fragmentary vertical sectional view of the cap supply magazine taken on line XXV—XXV of Figure 4.

Figure 26 is a vertical sectional view of the upper end of the cap feed magazine and the lower portion of the cup crimping mechanism taken on line XXVI—XXVI of Figure 4.

Figure 27 is a top plan view of the cap feed magazine taken on line XXVII—XXVII of Figure 26.

Figure 28 is an enlarged transverse section taken through the cap supply magazine on line XXVIII—XXVIII of Figure 25.

Figure 29 is a vertical detail section of the cap delivering and cup crimping mechanism with parts positioned ready to deliver a cap into a filled cup.

Figure 30 is a similar vertical section of the cap delivering and cup crimping mechanism illustrating a further step in the operation in which the cap is delivered into the filled cup with the upper margin of the cup deflected or crimped over the flange of the cap to hold the same in position.

Figure 31 is a bottom plan view of the cap delivering and cup crimping mechanism taken on line XXXI—XXXI of Figure 23.

Figure 32 is an enlarged fragmentary radial section taken through the cup crimping mechanism on line XXXII—XXXII of Figure 31.

Figure 33 is an enlarged detail section of the upper portion of the cup crimping mechanism taken on line XXXIII—XXXIII of Figure 30.

As shown on the drawings:

Figure 8:
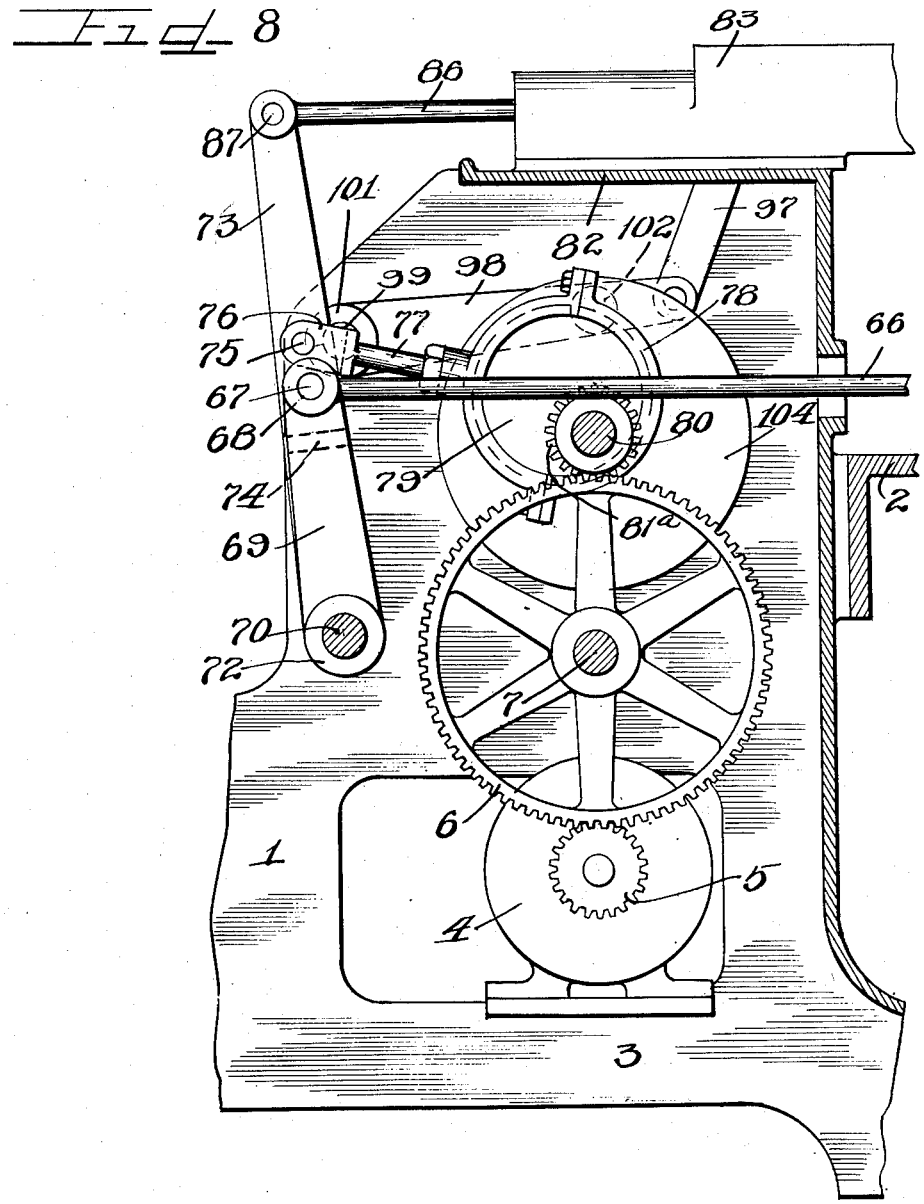
Figure 8 is a vertical detail view of the machine driving mechanism and the controls for the turntable and the material feed mechanism taken on line VIII—VIII of Figure 3.

The improved rotary type filling and capping machine for containers embodying the present invention, embraces mechanisms adapted to automatically deliver cups or containers from the cup magazine one at a time into receiving pockets of a rotary turntable provided with cam-controlled arms preventing the containers from falling through openings in the turntable. The turntable is adapted to be rotated intermittently to advance the empty containers one at a time beneath a filling device which is automatically controlled by valve means, whereby a predetermined quantity of a material is delivered from a hopper into a container when in its receiving position. The machine furthermore includes a magazine adapted to raise a stack of caps into a position to permit the uppermost cup to be withdrawn by pneumatic means by a pivotally mounted device which not only carries a cap suction or gripping mechanism, but furthermore is equipped with a container rim deflecting and crimping die mechanism which is adapted to be swung into a position over the rotating turntable and be properly centered above a filled container to permit a cap to be delivered downwardly into the filled container after which the crimping mechanism is brought into play to first deflect the margin of the filled container and then crimp said margin downwardly over the flange of the cap which has been deposited within the filled container. After the container has been filled and properly capped as described, a control cam below the turntable acts to automatically open the holder arms which retain a container in place, thereby permitting the filled container to fall downwardly through an opening in the turntable and rest in a chute disposed in a convenient position to permit a finger on the turntable to advance the container along the chute into a position to be readily removed from the machine.

With the above briefly mentioned operation in mind, the improved machine consists generally of a plurality of associated devices which are supported upon a metal framework or base 1, having a shelf or table 2 rigidly supported on the front side thereof. Mounted upon the lower cross members 3 of the frame 1 is a driving motor 4 having a driving pinion 5 secured on one end of the shaft thereof, as illustrated in Figure 8. The motor 4 is adapted to be controlled by means of an electric switch which may be secured in any desired position upon the machine framework 1. Meshing with the driving pinion 5 is a large gear 6 which is keyed or otherwise secured upon a main camshaft 7 which is journalled transversely in suitable bearings within the framework 1. The main camshaft 7 also projects outwardly from the framework 1, and extends through an auxiliary housing 8 secured on one side of the framework.

The machine is provided with an automatic cup feed mechanism which is adapted to be driven from the camshaft 7. Secured on one projecting end of the camshaft 7 is a sprocket-wheel around which an endless chain 9 is trained. The chain 9 is also trained around a sprocket wheel which is engaged upon a stub shaft 10, journalled in suitable bearings provided upon the upper portion of a bracket 11. The lower end or base of the bracket 11 is rigidly secured upon the table 2 as clearly illustrated in Figure 6. Also secured on the stubshaft 10 is a gear 12 which meshes with a gear 13. The gear 13 is rigidly secured upon a clutch sleeve 14 which is slidably mounted in a bearing 15 formed on the bracket 11. A knurled head 16 is provided on the outer end of the slidable sleeve 14 to afford a convenient arrangement whereby the slidable clutch sleeve 14 may be moved in or out as desired. The inner end of the clutch sleeve 14 is provided with a pair of diametrically opposite notches 17, (Fig. 12) adapted to be moved over a clutch pin 18 to transmit a drive to a container supply control shaft 19. The control shaft 19 is journalled in suitable bearings 20 supported on base ring 21 which is provided in the lower end of a cylindrical housing 22 of a container holding magazine. Rigidly secured on the exterior of the magazine housing 22, is a mounting block 23 having a dovetailed slot therein for the reception of a dovetailed rib 24 which is integrally formed on an extension bracket arm 25. The bracket arm 25 is riveted or otherwise rigidly secured to the upper end of the supporting bracket 11, as clearly shown in Figure 12.

Supported upon the top of the cylindrical housing 22 is a collar or ring 26 having integrally formed therein a toothed container supporting ring 27 upon which the lowermost container of a stack of containers is adapted to seat, with the apex or lower portion of the container projecting downwardly through the ring 26 and into the housing 22. Removably engaged in the ring 26 is a cover or dome 28 constructed of glass or other suitable material and having its upper end closed. The dome 28 is adapted to act as a covering for a stack of nested conical containers which are to be dispensed. The diameter of the mouths of the containers is greater than the diametrical distance between opposite teeth or fingers of the ring 27 so that the containers are adapted to be disposed in the dome with the side walls of the lowermost container resting against the fingers or projections of the ring 27. In this position the mouth of the lowermost container is disposed above the ring 27 with the greater portion of the conical body or side walls of the lowermost container projecting into the housing 22 and exposed to the operation of container withdrawing or dispensing mechanisms hereinafter more fully described. The ring 27 is provided with teeth or projections so that when a container is drawn downwardly the upper margin of the conical wall of the container is flexed into the spaces between adjacent teeth to facilitate dispensing of the container without injury thereto.

Positioned in the rear portion of the housing 22 and connecting the base ring 21 with the toothed flange ring 27 is a pair of rods or posts 29. Engaged on the inner end of the container supply control shaft 19 is a crank 30 to which the lower end of a gripper actuating member or connecting bar 31 is pivotally connected. The upper end of the connecting bar 31 is pivoted on a pin 32 supported in a head or block 33 which is reciprocal on the guide rods 29. Pivotally mounted on the guide rods 29 is a pair of sleeves 34, to which cup gripper arms 35 are secured in a position to be oscillated transversely of the container path. The gripper arms 35 being formed on the sleeves 34 permit the gripper arms to be reciprocated upon the guide rods to effect dispensing of a container and positioning of the gripper arms for subsequent cup gripping. Formed on each gripper sleeve 34 is a dog 36 with which the connecting bar 31 cooperates to effect oscillation of the grippers on the guide rods 29. Engaged on each of the gripper arms 35 are a plurality of rubber friction pads or bands 37, the gripping or frictional faces of which are inclined with respect to the longitudinal axis of the path of movement of the container within the housing 22 to facilitate proper gripping of the conical wall of the lowermost container in the stack. By referring to Figures 13, 14 and 15 it will be noted that the connecting bar 31 is slotted to provide a pocket for receiving the diametrically opposite dogs 36. This pocket is covered by the plate 38. The pocket is of sufficient size to permit the dogs to pivotally move therein as the bar 31 is oscillated about pin 32 by the crank 30. The dogs 36 are disposed between the connecting bar 31 and plate 38 whereby the gripper sleeves 34 may be actuated to cause the gripper arms 35 to be swung transversely into a container gripping position as a result of the oscillating movement of the bar 31.

In the operation of the container feed mechanism hereinbefore described a stack of nested conical paper containers is engaged in the dome 28 of the container holding magazine with the lowermost container supported by the teeth or fingers of the supporting flange or ring 27 (Figure 13).

The lower portion of the bottom container projects downwardly between the gripper arms 35, which at this particular time in the operation should be open. When the clutch sleeve 14 is pushed inwardly, the notches 17 engage over the clutch pin 18 thereby permitting a drive from the chain 9 to be transmitted by the gear 12 to the gear 13 to cause rotation of the cup supply control shaft 19. When the shaft 19 is rotated, the crank 30 serves to actuate the connecting bar 31 to cause the sleeves 34 to be reciprocated on the slide rods 29 and be oscillated transversely of their reciprocal path. Movement of the connecting bar 31 in one direction of its oscillatory axis will cause the plate 38 to act on the dogs 36 to swing the gripper arms 35 inwardly toward one another thereby causing the resilient gripper pads 37 to be pressed into engagement with the walls of the lowermost container in the dispenser. The head 33 is so positioned that when the connecting bar 31 is operated, the sleeves 34 are caused to reciprocate on the guide rods 29 causing the closed grippers to draw downwardly on the lowermost container to cause the same to be drawn through the tooth supporting ring 27 into the housing 22. The continued operation of the connecting bar 31 now causes the gripper arms 35 to swing outwardly away from one another thereby releasing the container and permitting the same to drop by gravity downwardly through the outlet opening in the base ring 21 of the container dispenser. When a container is dispensed from the fed magazine, said container is adapted to drop by gravity into a centered opening 39 of a rotatable turntable 40.

Having described the container dispensing mechanisms and the operation thereof, a description will now be given of the turntable mechanism which acts to carry the dispensed empty containers through a horizontal plane toward a container filling attachment.

Rigidly mounted upon the shelf or table 2 is a bearing sleeve 41 in which a vertical turntable supporting shaft 42 is rotatably engaged. The turntable 40 is keyed or otherwise secured on the upper end of the supporting shaft 42 and is retained in position by means of a head 43 which is threaded upon the upper bolt end 44 of the shaft as clearly illustrated in Figure 21. The turntable 40 is provided with a plurality of the openings 39 which are spaced equidistantly from one another and are arranged in a circle around the outer portion of the turnable as clearly illustrated in Figure 16.

Mounted on the under surface of the turntable 40 are a plurality of container holder mechanisms which are associated with the openings 39 in the turntable. Each of the container holding mechanisms comprises two arms 45 and 46 which are pivoted on studs 47 engaged through suitable openings in the turntable 40. Integrally formed on the outer end of each of the holder arms 45 and 46 is a semi-circular or half socket container holding segment 48 having a semi-conical seat 49 formed therein. The two holding segments 48 are adapted when the arms are in their closed position to abut one another to afford a circular pocket or holder adapted to receive and hold a conical paper container in an upright position in the turntable to permit the container to be advanced and filled. Integrally formed on the pivoted end of each holder arm 45 is a tooth 50 which coacts with a tooth 51 integrally formed on the pivoted end of the arm 46 as illustrated in Figure 16. Connected to each holder arm 45 is one end of a coiled control spring 52 the other end of which is connected to a rib 53 integrally formed on the bottom of the turntable 40. The control spring 52 acts to normally hold the holder arms 45 and 46 in their open or separated position. Integrally formed on each of the cup holder arms 46 is a bell-crank arm 54 on the outer end of which a roller 55 is rotatably mounted. During the rotation of the turntable 40 the control roller 55 is adapted to come in contact with and roll over a control segment shaped cam 56 which governs the closing of the container holding segments 48 at predetermined times to prevent containers from falling through the openings 39 of the turntable. The control cam 56 governing the operation of the cup holders on the turntable is stationary and is supported by means of a plurality of bracket arms 57 supported on the shelf 2.

The turntable 40 is adapted to be rotated intermittently by means of the following mechanism. Pivotally mounted on the turntable supporting shaft 42 above the stationary sleeve 41 is a bracket plate 58. Pivoted upon the upper side of the bracket plate 58 is a pawl 59 provided with a guide pin 60 which slidably projects through an opening in an arm 61 projecting upwardly from the bracket plate 58. A coiled control spring 62 is engaged around the guide pin 60 between the pawl 59 and the arm 61 as clearly illustrated in Figure 3. The spring 62 acts to resiliently hold the pawl 59 in engagement with one of the teeth of a ratchet 63 which is keyed or otherwise secured upon the turntable shaft 42 above the bracket plate 58. The upper end of the turntable shaft 42 is journalled in a bearing arm 64 positioned beneath the turntable and above the ratchet 63 as illustrated in Figures 3 and 21. The bearing bracket 64 projects outwardly and is secured to the upper end of a supporting post or pedestal 65, the enlarged base of which is rigidly secured upon the shelf 2.

Pivotally connected to one end of the bracket plate 58 is one end of a connecting rod 66, the other end of which is pivoted on a stud shaft 67 journalled in a yoke member 68. The yoke 68 is integrally formed on the upper end of a crank arm 69, the lower end of which is pivotally mounted on a horizontal shaft 70 which is journalled in suitable bearings 71 formed on the inner walls of the framework 1. The crank arm 69 is integrally formed on a sleeve 72 which is journalled on the shaft 70. Integrally formed on the sleeve 72 at one end and opposite the crank arm 69 is a long crank arm or lever 73. The lever 73 is integrally connected with the yoke member 68 of the crank 69 by means of a bridge piece or cross bar 74. Projecting through the lever 73 intermediate the ends thereof is a pin 75 on which a fork member 76 is pivotally engaged. The fork member 76 is secured on one end of a rod 77 which is connected radially on the exterior of an eccentric ring 78. The eccentric ring 78 is engaged on an eccentric disc 79 which is mounted on a shaft 80 which is journalled in suitable bearings 81 secured on the inner walls of the machine framework 1 as clearly illustrated in Figure 3. Keyed or otherwise secured on the eccentric shaft 80 is a pinion 81a which meshes with the gear 6 (Figure 8) to receive a drive from the motor 4.

It will thus be noted that the rotation of the turn-table 40 is controlled by the eccentric disc 79 and the eccentric ring 78 which co-acts therewith causing a drive to be transmitted through the rod 77 and the fork member 76 to the lever 73 to cause the same to be swung back and forth on the shaft 70. With the operation of the lever 73 the crank 69, which is also formed on the sleeve 72 is also swung back and forth thereby causing reciprocation of the connecting rod 66 and actuation of the bracket plate 58 to which it is pivotally connected. It will thus be noted by looking at Figure 3 that at the time the connecting rod 66 is moved outwardly the bracket plate on which the pawl 59 is pivotally engaged moves outwardly thereby causing the pawl 59 to rotate the ratchet 63 one-eighth of a revolution, thus causing the turn-table 40 to be rotated through one-eighth of a revolution to move a container away from underneath the container dispenser into an intermediate position ready to be advanced beneath a container filling mechanism which will now be described.

Rigidly mounted upon the top wall 82 of the framework 1 and radially with respect to the turntable 40 is a plunger housing 83 provided with a pair of parallel material receiving and measuring chambers 84 in which plungers or pistons 85 are adapted to be reciprocated. Pivotally connected to the plungers 85 are a pair of plunger rods 86, the outer ends of which are pivotally engaged on a pin 87 which projects through the upper end of the lever 73. Integrally formed on the front end of the plunger housing 83 is a valve housing 88 which projects over a portion of the turntable 40. Pivotally mounted within a valve recess within the valve housing 88 is a material control valve 89 having a pair of material receiving pockets 90 formed therein and adapted to register with the material receiving compartments 84 when the valve is in closed position. Formed in the bottom of the valve housing 88 is a material discharge opening or passage 91 as clearly illustrated in Figure 9. The upper end of the valve housing 88 is provided with a tapered material receiving passage 92 with which a material feed passage 93 registers. The material feed passage 93 is tapered and is formed within a base 94 of a material supply hopper or tank 95. The base of the hopper is rigidly secured upon the top of the housing 83.

Engaged on one projecting end of the material control valve 89 is a valve operating crank arm 96 to the end of which a connecting link 97 is pivotally connected. The lower end of the connecting link 97 is pivotally connected to one end of a crank arm 98 the other end of which is pivoted on a stub shaft 99 engaged in a supporting collar 100 which is integrally formed on the inner face of one of the walls of the framework 1 as clearly illustrated in Figure 2. A retaining collar 101 is secured on the end of the stub shaft 99 to one side of the sleeve which supports the crank arm 98. Rotatably supported on one side of the crank arm 98 is a roller 102 which projects into a cam groove 103 provided in a cam disc 104 which is mounted upon the control shaft 80 adjacent the eccentric disc 79. A detailed showing of the control cam 104 which governs the operation of the material supply valve 89 is clearly illustrated in Figure 11.

A brief description of the container filling mechanisms will now be given. To facilitate this description the various positions of a container on the turntable as illustrated in Figure 2 will be designated by the letters A, B, C, D, E, F, G, and H. When a container is discharged from the dispenser mechanism the container is permitted to drop by gravity into the holder in position A of the turntable and with the next operation of the pawl 59 and the ratchet 63 by means of the connecting rod 66 and the crank arm 69, the turntable is rotated one-eighth of a revolution thereby carrying the deposited container from station A into station B (Figure 2). The next operation of the turntable rotating mechanism causes the turntable to be rotated another one-eighth of a revolution thereby causing the empty container to be advanced from station B into the filling station C and directly under the material discharge passage 91 formed in the bottom of the valve housing 88 (Figure 9). As a container is moved into a filling position C the valve 89 which is controlled by the cam groove 103 and the roller 102 is moved from a closed position with respect to the discharge passage 91, as illustrated in Figure 9, into an open position with respect to the outlet passages 92 and 93 of the hopper 95. With the valve in its closed position with respect to the discharge passage 91 ice-cream, a liquid or any other substance within the hopper 95 is adapted to flow downwardly by gravity through the passages 93 and 92 through the valve chambers 90 and into the measuring chambers or passages 84 of the housing 83. When the measuring passages or chambers 84 are being filled with a quantity of the material the plungers 85 are in their retracted position which is governed by the eccentric disc 79 and the eccentric ring 78 with which the lever 73 is connected. It will thus be noted that predetermined quantities of the material are permitted to be fed into the measuring chambers 84 ready to be delivered into an empty container in the filling position C of the turntable.

With the inward swinging movement of the lever 73 controlled by the eccentric disc 79, the plunger rods 86 are moved inwardly in the housing 83 thereby causing the plunger 85 to move inwardly. At this point in the operation the cam groove 103 acting on the roller 102 causes the material control valve 89 to be rotated into an open position with respect to the discharge passage 91 thereby causing the material supply passage 92 to be closed by the valve and furthermore causing the two chambers 90 of the valve to be moved into register with the material measuring passages 84 and the material discharge passage 91. With the valve positioned in its discharge position, the plungers 85 moving through the measuring passages 84 cause the material therein to be discharged or pushed outwardly through the valve passages 90 into the material discharge passage 91 permitting the material to be deposited in the centered container which is positioned in station C of the turntable. It will thus be noted that a predetermined quantity of ice-cream or other material measured by the measuring chambers 84 is thus automatically deposited into a container when in the filling position. After a container has been filled with a predetermined quantity of material in position C, the turntable operating mechanisms are again brought into play to cause the turntable 40 to be rotated another one-eighth of a revolution thereby advancing the filled container from sation C into station D ready to be capped.

The cap dispensing and feeding mechanism will now be described. Rigidly secured upon one corner of the framework 1 is a bracket 105 having a U-shaped or channel arm 106 integrally formed thereon. Integral with the U-shaped arm 106 is a bracket sleeve 107 having a flange integrally formed on the upper end thereof. Rigidly secured upon the flange of the bracket sleeve 107 is a sleeve or collar 108. Integrally formed on one side of the bearing sleeve 108 is a horizontal auxiliary table 109. One corner of the auxiliary table 109 may be either rigidly secured or integrally formed on the corner of the framework 1. The auxiliary table 109 is provided with a ring flange or rim 110 which surrounds an opening in said table. Positioned beneath the auxiliary table 109 and registering with the opening therein is a cylindrical collar or magazine supporting head 111 having a pair of apertured supporting projections or arms 112 integrally formed diametrically thereon as clearly illustrated in Figure 27. The arms 112 are adapted to be bolted or otherwise secured to the bottom of the auxiliary table 109 to rigidly hold the collar 111 in position. The cap holding magazine collar 111 is provided with a lining 113 in which a plurality of equidistantly spaced vertical slots 114 are provided approximately 90° apart. The lower end of the lining or sleeve 113 is beveled outwardly to afford a tapered passage 115, the upper end of which is of a diameter equal to the diameter of the inner wall of the lining sleeve 113 as clearly illustrated in Figure 26. Mounted in each of the grooves 114 of the lining sleeve 113 is a plate spring 116. The upper end of the plate springs 116 are curled outwardly and are adapted to be projected into notches 117 provided in the upper rim of the magazine collar 111, when said springs 116 are forced outwardly by the upward movement of a stack of disc caps 118 each of which is provided with a bevel peripheral flange 119. The stack of caps 118 is supported on a movable shelf 120 (Figure 25) which is movably engaged within a cap holding magazine supported on the lower end of the magazine collar 111. The cap magazine comprises an arc shaped or curved semi-cylindrical wall 121 the upper end of which is offset and is riveted or otherwise secured to a portion of the lower rim of the magazine collar 111, as shown in Figure 26. Rigidly secured to the lower end of the curved magazine wall 121 is a bottom plate 122 having a radially projecting arm 123 formed thereon. Pivotally mounted on the rear vertical wall of the magazine housing section 121 by means of hinges 124 is a pivoted substantially semi-circular magazine wall or section 125. The magazine housing section 125 is adapted to be swung outwardly about the hinges 124 to permit a stack of flange caps 118 to be seated upon the movable shelf 120 when it becomes necessary to replenish the supply of caps within the cap feeding magazine. The front vertical edges of the two cap magazine sections 121 and 125 are spaced from one another to afford a vertical groove 126 to permit the supporting arm 127 of the movable shelf 120 to project outwardly so that the collar 128 thereof may be slidably engaged upon a guide bar 129. The lower end of the guide bar 129 is supported by the arm 123 at the base of the cap magazine while the upper end of said guide rod is secured to the auxiliary table 109. A handle 130 is integrally formed on the collar 128 to permit the cap supporting shelf 120 to be manually lowered after the supply of caps has been exhausted and it becomes necessary to reload the cap holding magazine.

Also integrally formed on one side of the shelf guide collar 128 is an arm 131 to which one end of a chain 132 is attached. The chain 132 is conducted upwardly over a sprocket 133 and then hangs downwardly and supports a counterweight 134 on the lower end thereof. The sprocket 133 is keyed or otherwise secured on a stub shaft 135 which is journaled in a pair of supports or standards 136 rigidly secured in parallel relation upon the top of the auxiliary table 109. Engaged on the stub shaft 135 adjacent the inner wall of the outermost bearing standard 136 is a bracket plate 137 which is rigidly secured in place by means of bolts 138 and a clamping bar 139 as clearly illustrated in Figures 17 and 18. Supported transversely through the bracket plate 137 is an adjustable supporting screw 140 on one end of which a friction shoe 141 is secured. The friction shoe 141 has frictional rubbing contact with one side surface of a ratchet wheel 142 which is also secured on the stub shaft 135 between the bearing standards 136. Co-acting with the toothed peripheral surface of the ratchet 142 is a spring controlled pawl 143 which is mounted on a stub shaft 144 engaged through one end of a control bar 145 which is pivoted intermediate its ends on the stub shaft 135 and has a control spring connected to one end thereof. The pawl and ratchet mechanism 143 and 142 is adapted to be operated by means of a movable setscrew 146 which is adjustably supported on a bracket arm 147. The bracket arm 147 is rigidly supported on a sleeve 148 which is rotatably and slidably mounted as hereinafter more fully described and comprises a part of the cap feeding mechanism.

In the operation the sleeve 148 is adapted to be rotated to swing the bracket arm 147 from the full line position of Figure 7 into the dotted line position directly above the end of the stub shaft 144 after which the sleeve 148 is lowered carrying the arm 147 downwardly so that the setscrew 146 comes into engagement with the stub shaft 144 thereby causing the bar 145 to be tipped downwardly to cause the pawl 143 to rotate the ratchet 142 a predetermined amount. The shaft 135 is accordingly rotated a certain degree whereby the sprocket 133 is also rotated to actuate the chain 132 thereby causing the shelf 120 to be raised a predetermined distance to move the stack of caps upwardly to properly position the uppermost cap in a position to be removed from the magazine. With the upward movement of the sleeve 148 the setscrew 146 is moved upwardly out of engagement with the stub shaft 144 thereby permitting the spring controlled pivoted bar 145 to spring upwardly into its normal substantially horizontal position to permit the pawl 143 to obtain a new hold on the ratchet 142 ready for the next feeding operation of the caps. The friction shoe 141 co-acting with the side of the ratchet 142 prevents the ratchet 142 from rotating in a reverse direction during the time that the pawl 143 is changing engagement with the teeth of the ratchet 142.

Having described the mechanisms which are provided for feeding caps upwardly out of the cap holding magazine it will be conducive to a better understanding of the invention to now describe the mechanisms for removing the caps individually from the cap supply magazine and transferring the caps one at a time into a position above the filled containers so that the caps may be individually deposited one into each of the filled containers to protect the contents of the containers.

The sleeve 148 is engaged on a rotatable and reciprocating vertical control shaft 149, said sleeve 148 being held by means of a setscrew or other suitable means. The vertical control shaft 149 is journaled in the bearings 107 and 105 and has a grooved collar 150 secured on the lower projecting end thereof. Rigidly engaged in the groove of the clutch collar 150 is a pair of diametrically opposite pins 151 which are carried by a yoke arm 152 which is integrally formed on one end of a fulcrum bar 153 pivoted intermediate its ends on a stub shaft 154 supported in the housing 8.

The fulcrum bar 153 has one end of a coiled spring 155 attached to the end of said bar. The other end of the coil spring 155 is engaged on a pin 156, projecting from the inner wall of the housing 8 as clearly illustrated in Figure 3. Rotatably supported on the fulcrum bar 153 is a cam roller 157 which co-acts with a cap feed and cap transfer control cam 158 which is mounted upon the shaft 7 within the housing 8. The cap feed and transfer control cam 158 is rigidly secured or integrally formed on one side of a cam plate or disc 159 which is also disposed within the housing 8 on the shaft 7. Formed on the inner face of the cam disc 159 is a cam groove 160 (Figure 5) in which a control roller 161 is positioned to travel. The cam groove 160 and the roller 161 control the rotation of the vertical shaft 149 and therefore govern the swing of the cap transfer mechanism.

The roller 161 is rotatably mounted on a rack arm 162 having a guide fork or yoke 163 integrally formed on one end thereof and slidably engaged over one of the bearing sleeves for the shaft 107 as clearly illustrated in Figure 5. The rack arm 162 projects outwardly through an opening in the housing 8 and has a rack 164 formed on the outer end thereof (Figure 3). The rack 164 has meshing engagement with a pinion 165 positioned in the channel bracket 106 and through which the vertical shaft 149 and a key thereon is adapted to slidably fit.

Integrally formed on the upper bearing sleeve 148 is an arm 166 on the outer end of which a bearing sleeve 167 is integrally formed. Formed on one side of the arm 166 is a projection 168 having a passage therein in which a centering post or pin 169 is engaged and held in place by means of a set screw 170 (Figure 20). The lower end of the centering post 169 is tapered at 171 to permit the same to be readily projected into a tapered centering opening 172 formed in the table 109. When the cup control arm 166 is in the full line position as illustrated in Figures 2 and 7 and is lowered due to the action of the spring 155 and the control cam 158 the centering post 169 is lowered so that the centering tip 171 thereof engages in the centering aperture 172 of the table 109, thereby holding the cap delivering or dispensing mechanism in a centered position over a filled container in the turntable 40. When the cap control arm 166 is swung into the cap attracting position as indicated in dotted lines in Figure 7 and is lowered due to the action of the spring 155 and the control cam 158 the centering post 169 is lowered into a centering aperture 173 provided in the table 109 adjacent the cap magazine so that the mechanisms which are provided for pneumatically gripping the uppermost cap in the magazine, are in a properly centered position.

Having described the mechanisms which control and operate the swinging, raising and lowering of the cap control arm 166, the cap gripping and transfer devices and the container rim deflecting and crimping devices will now be described.

Slidably engaged in the sleeve 167 is a vertically slidable plunger 174 having an air passage 175 therein. Engaged in the upper projecting end of the plunger sleeve 174 is a valve housing or head 176 having an air passage 177 formed longitudinally therein and registering with the upper end of the air passage 175 in the sleeve 174. Pivotally mounted on the valve casing or head 176 is a spring controlled flap valve 178 which normally is resiliently held in closed position to close the air passage 177. The air flap valve 178 is adapted to be opened when brought in contact with a valve control pin 179 which is supported in vertical position in the end of an arm 180 which is rigidly secured on a flange of the valve housing 88 as clearly illustrated in Figure 6. Connected in the side of the valve housing 176 is one end of an air suction pipe or hose 181, the other end of which is connected with an air suction pump or the like mounted in any convenient position near the machine. Secured in the lower end of the plunger sleeve 174 is the shank 182 of a cap gripper and plunger head 183 having a recess 184 provided in the bottom thereof and communicating with a passage 185 the upper end of which communicates with the lower end of the air passage 175 in the plunger sleeve 174. Locked between the lower end of the plunger sleeve 174 and the shank 182 of the cap gripper head 183 is a hood 186 having rigidly secured therein a cup rim deflecting ring 187 provided with a plurality of beveled teeth 188 which slidably interfits with peripheral crimping teeth 189 formed on the lower margin of a crimping die 190.

The crimping die 190 is slidably mounted within the deflecting collar or ring 187 and has attached thereto the lower threaded ends of a pair of diametrically opposite posts 191, the upper ends of which are rigidly secured to a crimper control plate or disc 192 which is centrally apertured and has sliding engagement over the plunger rod 174. Engaged around the lower portion of the plunger rod 174 is a coiled spring 193, the lower end of which seats upon the top of the hood 186, while the upper end of said spring contacts against the bottom of the crimper control disc or plate 192 as clearly illustrated in Figure 23.

Secured near the upper end of the plunger rod 174 is a collar 194 which is spaced a short distance below the flanged lower end of the air valve housing 176, leaving a peripheral groove 195 into which a pair of oppositely positioned pins 196 projects. The pins 196 are supported diametrically opposite one another in a pair of arms 197 which form an integral part of a fulcrumed beam 198 which is of channel cross-section and is pivotally mounted intermediate its ends on a stub-shaft 199, supported in a bearing bracket 200 fastened upon the top of the cap control arm 166. One end of the fulcrumed channel beam 198 projects over the upper end of the vertical control shaft 149. Mounted upon the top of one end of the fulcrumed beam 198 is a boss 201 positioned to co-act with the lower end of a set screw 202 which is supported upon the upper horizontal arm 203 of an upright bracket 204 which is rigidly supported upon the housing 8.

Mounted upon the table 2 beneath the turntable 40 is a Y-shaped filled container receiving trough or chute 205. The container receiving chute 205 is disposed beneath the container release or discharge position E, of the turntable 40 to permit filled containers to be discharged into said receiving chute which is slightly inclined to permit the filled containers to be readily moved along the chute by fingers 207 on the bottom of the turntable, into a convenient position from which the containers may be removed from the chute to be placed in receiving trays or the like.

Having described the various parts comprising the cap feeding mechanisms, the cap transfer devices, and the container rim deflecting and crimping means, a brief description of the operation of these various mechanisms will now be given.

When a conical paper container 206 is carried by the turntable 40 from position B into position C and is being filled with a predetermined quantity of material, such as ice-cream, a cold drink, or any other material which is to be dispensed, the control cam 158 is in a position co-acting with the roller 157 to hold the arm 166 and the shaft 149 in their raised positions. At this point in the operation, the control cam groove 160 co-acting with the roller 161 actuates the rack 164, which in turn rotates the pinion 165 and the shaft 149 to swing the arm 166 from the full line position of Figure 7 into the dotted line position with the cap or cover transfer mechanism positioned substantially above the cap magazine. The control cam 158 (Figure 4) is now positioned to permit the coiled spring 155 to actuate the fulcrum bar 153 to cause the shaft 149 and the arm 166 carried thereon to be lowered, thereby causing the centering pin 169 to engage in the centering aperture or opening 173 of the auxiliary table 109 to properly center the cap gripper head 183 directly above the upper end of the cap supply magazine 121—125. With the lowering of the arm 166 the set screw 146 on the bracket arm 147 is moved into engagement with the stub-shaft 144 (Figure 17) thus causing the bar 145 to be tipped downwardly to cause the pawl 143 to rotate the ratchet 142 a predetermined amount, thereby causing the sprocket 133 to operate the chain 132. This movement of the chain 132 acts to elevate the shelf 120 within the cap magazine to elevate the stack of caps so that the uppermost cap in the stack is positioned directly beneath the cap transfer head 183.

The action of the air in the pipe 181 causes a suction action to take place in the air passages 177, 175, 185 and in the recess 184 of the gripper head 183 thereby causing the uppermost cap 118 in the magazine to be pneumatically gripped and held against the bottom of said gripper head 183. The action of the strap springs 116 in the upper end of the cap magazine serves to prevent more than one cap from being withdrawn from the magazine at a time.

The cam 158 now acts to operate the fulcrum bar 153 to elevate the vertical shaft 149 and the arm 166. Elevation of the arm 166 causes the cap gripper head 183 to be elevated to carry the gripped cap 118 upwardly out of the magazine. When the cap gripper head 183 is elevated, the turntable 40 is rotated one-eighth of a revolution thereby causing a filled container in position C to be advanced into position D while the rack 164 is operated in the opposite direction by the cam groove 160 and the roller 161 to cause the vertical shaft 149 to be partially rotated to swing the arm 166 from the dotted line position of Figure 7 into the full line position, thus delivering the gripped cap 118 into a position substantially directly above position D of the turntable.

At this stage in the operation the control cam 158 is positioned to release the pressure on the roller 157 thereby permitting the coiled spring 155 to pivot the fulcrum bar 153 so that the vertical shaft 149 and the arm 166 thereon is lowered permitting the centering post or pin 169 to be projected into the centering aperture 172 in the auxiliary table 109 to properly center not only the cap but the container rim deflecting and crimping mechanisms supported on the arm 166.

With the container rim deflecting and crimping mechanisms in a centered position above station D of the turntable, the cam 158 again releases pressure on the roller 157 permitting the coiled spring 155 to actuate the fulcrum bar 153 to cause the vertical shaft 149 and the arm 166 to be lowered. The fulcrumed beam 198 mounted upon the arm 166 is provided for the purpose of obtaining a greater stroke for the plunger sleeve 174. As the arm 166 is lowered, the fulcrum pin 199 for the beam 198 is also lowered whereby the inner end of said beam 198 contacting the lower end of the set screw 202 causes the outer end of the beam to gradually swing downwardly through the sleeve 167 at a rate greater than the downward movement of the arm 166. This relative movement between the plunger sleeve 174 and the bracket sleeve 167 permits the coiled spring 193 to expand retaining the crimping die plate 190 seated against the bottom surface of the deflecting hood 186.

With the lowering of the arm 166 and the downward sliding movement of the plunger sleeve 174, the cap 118 held by suction upon the bottom of the cap transfer head 183 is carried downwardly into the filled container 206, while the beveled lower margin of the container rim deflecting ring 187 is moved into contact with the upper margin of the filled container 206, causing the container margin to be deflected inwardly and slightly curved downwardly due to the shape of the teeth 188. The deflecting movement of the upper margin of the container 206 continues to take place over the upper edge of the flange 119 of the cap 118 until the lower edge of the hood 186 comes into contact with the top of the turntable 40.

As the plunger sleeve 174 moves downwardly, the air release control valve 178 is moved into contact with the valve control pin 179 thereby causing the valve 178 to be opened as illustrated in Figure 30 thus causing the suction action in the cap feeder head 183 to be released so that the pneumatic gripping action of the transfer head 183 on a delivered cap is broken.

With the rim of the container deflected over the flange of a seated cap 118, the downward movement of the arm 166 continues while the hood 186 and the plunger sleeve 174 are held stationary due to the contact of the hood 186 with the turntable 40. The continued downward movement of the arm 166 causes the sleeve 167 to force the crimper control plate 192 and the posts 191 downwardly with respect to the plunger sleeve 174, thus causing the crimper die 190 to slide downwardly with respect to the deflecting ring 187 thereby causing the crimping teeth 189 to slide relative to the deflecting teeth 188 to cause the deflected margin of the container to be crimped over the flange 119 of the cap 118 as clearly illustrated in Figures 30 and 32.

After a crimping operation as hereinbefore described, the cam 158 co-acting with the roller 157 operates the fulcrum bar 153 to cause the shaft 149 and the arm 166 to again move upwardly. The spring 193 which was compressed during the crimping operation now acts to first hold the hood 186 seated on the turntable 40 with the cap transfer head 183 still seated against the cap while the crimper control plate 192 is moved upwardly on the plunger shaft 174 with the upward movement of the sleeve 167. The crimper die 190 is first released due to the action of the spring 193 and moved upwardly into the hood 186. When the crimper die 190 contacts the inner surface of the top plate of the hood 186, the continued upward movement of the arm 166 now causes the cap transfer head 183 and the hood 186 to move upwardly out of contact with the filled container and away from the turntable 40 leaving the filled capped container seated in the turntable ready to be advanced into a discharge position. The upper movement of the arm 166 and the elevation of the fulcrum shaft 199 of the fulcrum beam 198 causes an increased movement in the stroke of the plunger shaft 174 caused by the co-acting relation of the inner end of the beam 198 with the set screw 202. As the plunger shaft 174 moves upwardly, the open air valve 178 moves out of contact with the valve control pin 179 thereby permitting the valve control spring to close the valve 178 and reestablish a suction action in the cap transfer head 183.

With the container deflecting and crimping mechanisms raised into their normal position and the suction action reestablished in the cap transfer head 183, the rack 164 is now moved in an opposite direction due to the action of the cam groove 160 on the roller 161 so that the pinion or gear 165 is rotated in an opposite direction thereby causing the shaft 149 to swing the arm 166 from the full line position illustrated in Figure 7 back into the dotted line position shown in said figure. The arm 166 is thus again moved into a position to dispose the cap gripper head 183 over the cap magazine, while the eccentric ring 78 and the eccentric disc 79 again cause operation of the pawl 59 (Figure 3) thereby causing the ratchet 63 to be rotated one-eighth of a revolution to cause a corresponding rotation of the turntable 40 whereby the filled container is advanced from station D into the discharge station E.

As a crimped filled container approaches station E, the control roller 55 for the cup holders 48 passes off of one end of the holder control cam 56 (Figure 16) thereby permitting the holder control spring 52 to exert a pull on the holder arm 45 causing said arm to swing away from the turntable opening 39 and simultaneously causing the tooth 50 to co-act with the tooth 51 of the holder arm 46 to swing said holder arm 46 outwardly into open position. The opening movement of the holder segments 48 thus causes release of the filled container which is permitted to drop through the turntable opening 39 into the discharge chute 205.

Mounted on each of the ribs 53 on the underside of the turntable 40 is a cup advancing finger or lug 207 which is adapted during the next one-eighth of a revolution of the turntable 40 to engage against one side of the deposited container in the chute 205 to push the same outwardly in the chute thereby causing the intermittent advance of previously deposited filled capped containers along the chute, towards a discharge position from which the filled containers may be either manually removed or deposited in any suitable type of conveyor mechanism associated with the machine.

The operation of the machine is continuous while the turntable, the container filling mechanism, the container rim deflecting and crimping mechanisms and the cap transfer or feed devices are adapted to operate intermittently due to the novel arrangement of the control cams which govern the various mechanisms. By referring to Figure 2 it will be noted that a plurality of containers to be filled and capped are carried through the machine at the same time and that a container from the container holding magazine is first automatically dispensed from the said magazine into one of the closed container holders of the turntable 40 in station A and with the next partial rotation of said turntable is carried from station A into station B and with another advance of the turntable is transferred from station B into the container filling position C where the filling mechanism acts automatically to deposit a predetermined quantity of material into the container. After a container has been filled in station C, the turntable is again partially rotated to advance the filled container into station D while the cap transfer mechanism pneumatically grips a cap in the upper end of the cap magazine and transfers the cap into a position above station D. The control cams 158 and 160 now operate to cause the cap to first be deposited within the filled container in station D after which the deflecting mechanisms bend the margin of the container inwardly to permit the crimping devices to positively engage the deflected rim of the container and crimp the same over the flange of the deposited cap. With the release of the cap delivering mechanisms and the crimping and deflecting devices, the turntable 40 is again operated to advance the filled capped container into the discharge station E where it is automatically released and deposited in the receiving chute 205 to be advanced by one of the fingers 207 carried on the underside of the turntable.

The improved machine affords an arrangement whereby containers such as conical cups and the like may be automatically filled with predetermined quantities of ice-cream, ices, or similar products, after which the filled containers are automatically capped and the caps retained therein by crimping the margins of the containers over the flanges of the caps to afford a sanitary arrangement whereby the products within the containers or cups may be readily and conveniently dispensed.

I am aware that many changes may be made and numerous details of construction may be varied through a wide range without departing from the principles of this invention, and I, therefore, do not purpose limiting the patent granted hereon, otherwise than necessitated by the prior art.

I claim as my invention:

1. In a machine for applying a cap to a filled container, a holder for maintaining the container in position with its open end uppermost and swingable means including a single head embodying both suction means for picking up a cap and crimping means operable upon the swinging of the head to a position over the filled container to crimp the upper peripheral edge of said container to the marginal portion of said cap.

2. In a machine for applying a cap to a filled container, a holder for maintaining the container in position with its open end uppermost and swingable means including a single head embodying both suction means for picking up a cap and crimping means operable upon the swinging of the head to a position over the filled container to crimp the upper peripheral edge of said container to the marginal portion of said cap, said suction means being disposed centrally of said crimping means and being depressable into said end of the container to dispose the cap in the container below the upper edge of the latter.

3. In a machine for applying a cap to a filled container, a holder for maintaining the container in position with its open end uppermost and swingable means including a single head embodying both suction means for picking up a cap and crimping means operable upon the swinging of the head to a position over the filled container to crimp the upper peripheral edge of said container to the marginal portion of said cap, said suction means being telescopingly associated with said crimping means and being movable into the open end of the container to dispose the cap on the top of contents therein whereby said crimping means may secure said cap to said upper edge of the container.

4. In a machine for applying a cap to a filled container, a holder for maintaining the container in position with its open end uppermost and swingable means including a single head embodying suction means for picking up a cap, deflecting means operable upon the positioning of said head over said open end of the container to deflect the upper peripheral edge of the container inwardly and crimping means operable upon the disposition of the cap in said open end of the container to crimp said deflected portion of the container to the marginal portion of the cap.

5. In a machine for applying a cap to a filled container, a holder for maintaining the container in position with its open end uppermost and swingable means including a single head embodying suction means for picking up a cap, deflecting means operable upon the positioning of said head over said open end of the container to deflect the upper peripheral edge of the container inwardly and crimping means operable upon the disposition of the cap in said open end of the container to crimp said deflected portion of the container to the marginal portion of the cap, said suction and crimping means being telescopically associated with said deflecting means.

6. In a machine for applying a cap to a filled container, a holder for maintaining the container in position with its open end uppermost and swingable means including a single head embodying suction means for picking up a cap, deflecting means operable upon the positioning of said head over said open end of the container to deflect the upper peripheral edge of the container inwardly and crimping means operable upon the disposition of the cap in said open end of the container to crimp said deflected portion of the container to the marginal portion of the cap, said suction and crimping means being disposed within the deflecting means and concentric therewith.

In testimony whereof I have hereunto subscribed my name at New York, New York County, New York.

CESARE BARBIERI.